(12) United States Patent
Vasseur et al.

(10) Patent No.: US 9,277,482 B2
(45) Date of Patent: Mar. 1, 2016

(54) ADAPTIVE REOPTIMIZATION RATE FOR UNSTABLE NETWORK TOPOLOGIES

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 13/293,818

(22) Filed: Nov. 10, 2011

(65) Prior Publication Data

US 2013/0121331 A1 May 16, 2013

(51) Int. Cl.
| | |
|---|---|
| H04L 12/28 | (2006.01) |
| H04W 40/30 | (2009.01) |
| H04W 40/14 | (2009.01) |
| H04L 12/721 | (2013.01) |
| H04L 12/753 | (2013.01) |
| H04J 1/16 | (2006.01) |
| H04L 12/24 | (2006.01) |

(52) U.S. Cl.
CPC .............. *H04W 40/30* (2013.01); *H04L 45/14* (2013.01); *H04L 45/48* (2013.01); *H04L 45/70* (2013.01); *H04W 40/14* (2013.01); *H04L 41/12* (2013.01)

(58) Field of Classification Search
CPC ..................................................... H04W 40/14
USPC .................................. 370/252, 254, 238, 386
See application file for complete search history.

(56) References Cited

U.S. PATENT DOCUMENTS

| | | | |
|---|---|---|---|
| 7,257,560 B2 | 8/2007 | Jacobs et al. | |
| 7,631,225 B2 | 12/2009 | Dini et al. | |
| 7,920,479 B2 | 4/2011 | Jacobs et al. | |
| 8,165,969 B2 | 4/2012 | Shah et al. | |
| 2006/0075275 A1 | 4/2006 | Dini et al. | |
| 2006/0250959 A1* | 11/2006 | Porat | H04L 12/5695 370/230 |
| 2006/0291485 A1 | 12/2006 | Thubert et al. | |
| 2007/0087756 A1* | 4/2007 | Hoffberg | G06Q 10/0631 455/450 |
| 2007/0280275 A1 | 12/2007 | Castagnoli et al. | |
| 2008/0025270 A1 | 1/2008 | Moon | |
| 2009/0109852 A1 | 4/2009 | Grover et al. | |
| 2012/0155475 A1 | 6/2012 | Vasseur et al. | |
| 2013/0094536 A1 | 4/2013 | Hui et al. | |
| 2013/0159550 A1* | 6/2013 | Vasseur | 709/242 |

FOREIGN PATENT DOCUMENTS

WO   WO-2009006188 A1   1/2009

OTHER PUBLICATIONS

Gnawali et al., "The Minimum Rank Objective Function with Hysteresis", <draft-ietf-roll-minrank-hysteresis-of-4>, IETF, May 17, 2011, 11 pages.

(Continued)

*Primary Examiner* — John Pezzlo
(74) *Attorney, Agent, or Firm* — Parker Ibrahim & Berg LLC; James M. Behmke; Stephen D. LeBarron

(57) ABSTRACT

In one embodiment, the network stability of a communication network is determined based on one or more network metrics related to stability, and then based on the network stability, a particular frequency at which to perform route reoptimization is determined, where the frequency inversely corresponds to the network stability. As such, distributed route reoptimization is triggered in the communication network at the adaptively determined frequency.

25 Claims, 14 Drawing Sheets

(56) References Cited

OTHER PUBLICATIONS

Pister et al., "TSMP: Time Synchronized Mesh Protocol", Proceedings of the IASTED International Symposium Distributed Sensor Networks, Nov. 16-18, 2008, pp. 391-398.

Thubert, "RPL Objective Function 0" <draft-ietf-roll-of0-15>, IETF, Jul. 8, 2011, 14 pages.

Vasseur et al., "Routing Metrics used for Path Calculation in Low Power and Lossy Networks" <draft-ietf-roll-routing-metrics-19>, IETF, Mar. 1, 2011, 31 pages.

Winter et al., "RPL: IPv6 Routing Protocol for Low Power and Lossy Networks" <draft-ietf-roll-rpl-19>, IETF, Mar. 13, 2011, 164 pages.

* cited by examiner

ADAPTIVE REOPTIMIZATION RATE FOR UNSTABLE NETWORK TOPOLOGIES

TECHNICAL FIELD

The present disclosure relates generally to computer networks, and, more particularly, to topology reoptimization for computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

One significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

One fundamental problem is that nodes in many LLNs only maintain links in the UPWARD direction (toward a root node), and detect link failures reactively when sending a data packet. If a node has no data packets to send, it will not detect the link failure and will not notify the root that the link is no longer valid. As a result, the root will continue to send traffic down an invalid path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
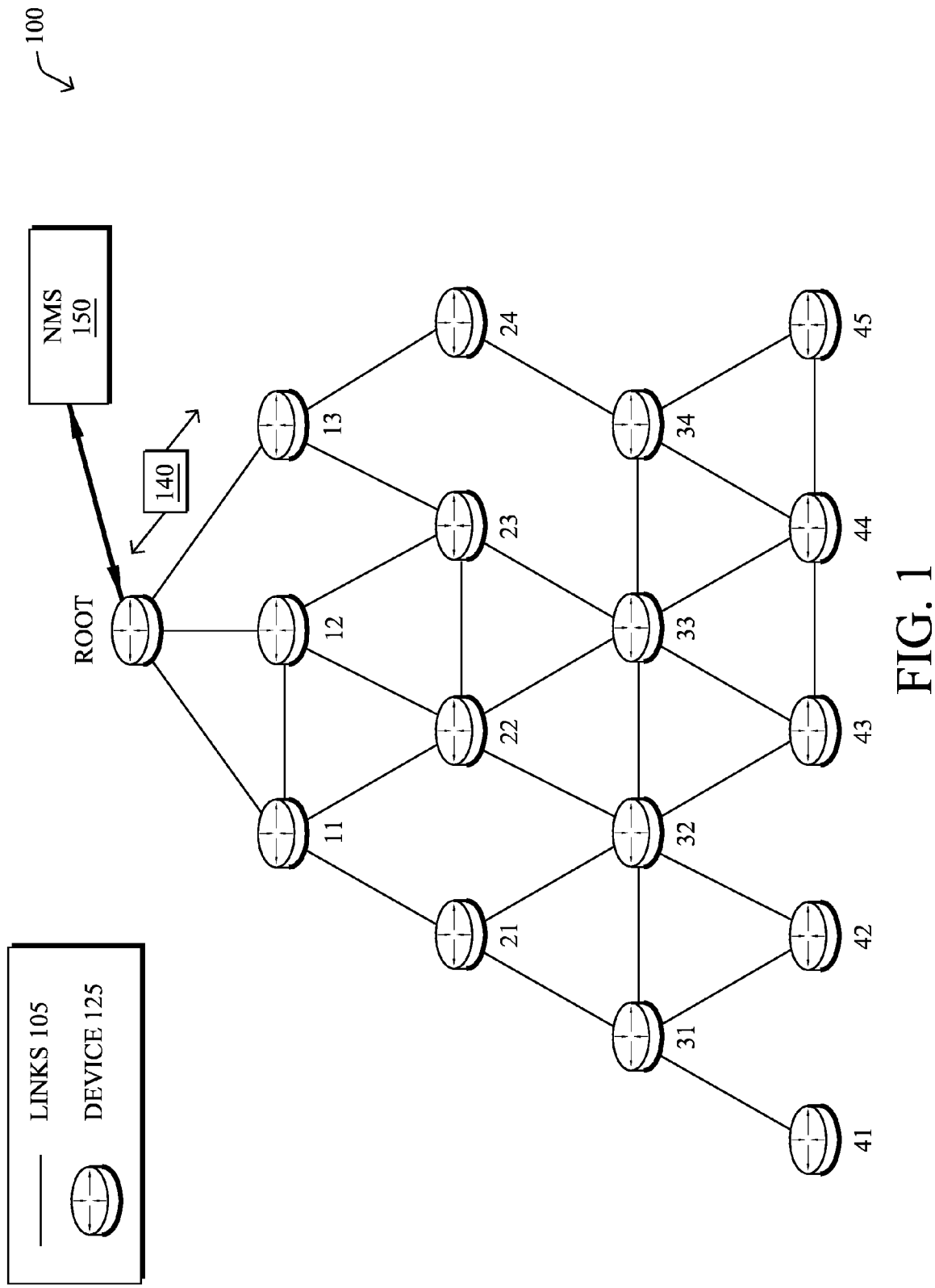
FIG. 1 illustrates an example communication network.

According to one or more embodiments of the disclosure, the network stability of a communication network is determined based on one or more network metrics related to stability, and then based on the network stability, a particular frequency at which to perform route reoptimization is determined, where the frequency inversely corresponds to the network stability. As such, distributed route reoptimization is triggered in the communication network at the adaptively determined frequency.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45," and described in FIG. 2 below) interconnected by various methods of communication. For instance, the links 105 may be wired links and/or shared media (e.g., wireless links, PLC links, etc.), where certain nodes 125, such as, e.g., routers, sensors, computers, etc., may be in communication with other nodes 125, e.g., based on distance, signal strength, current operational status, location, etc. In addition, various other devices, such as a head-end application device or a network management server (NMS) 150 may be present in the network 100, such as via a WAN reachable by node 11-45 through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
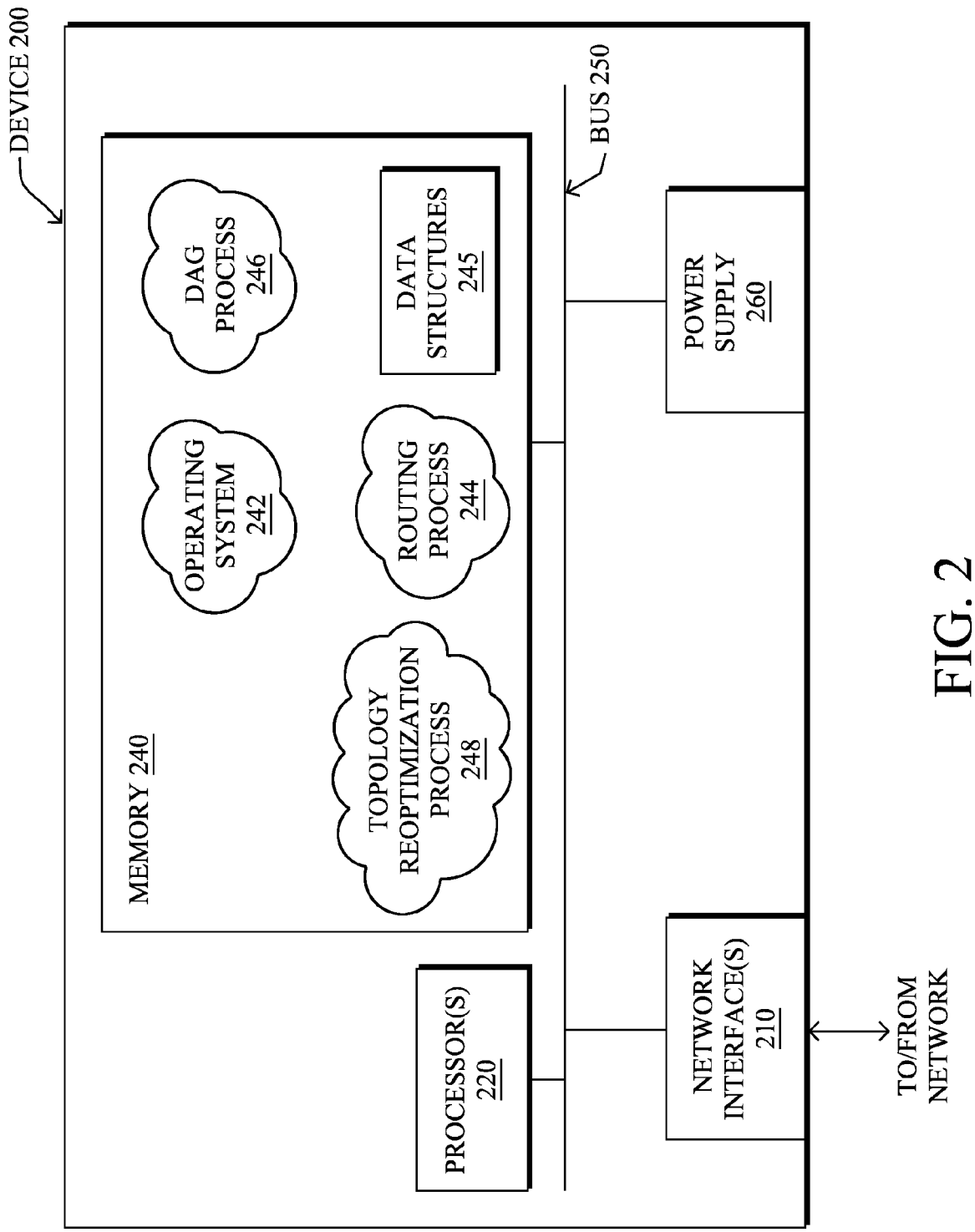
FIG. 2 illustrates an example network device/node.

FIG. 2 is a schematic block diagram of an example node/device 200 that may be used with one or more embodiments described herein, e.g., as any of the devices 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

It should be noted that PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative topology reoptimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
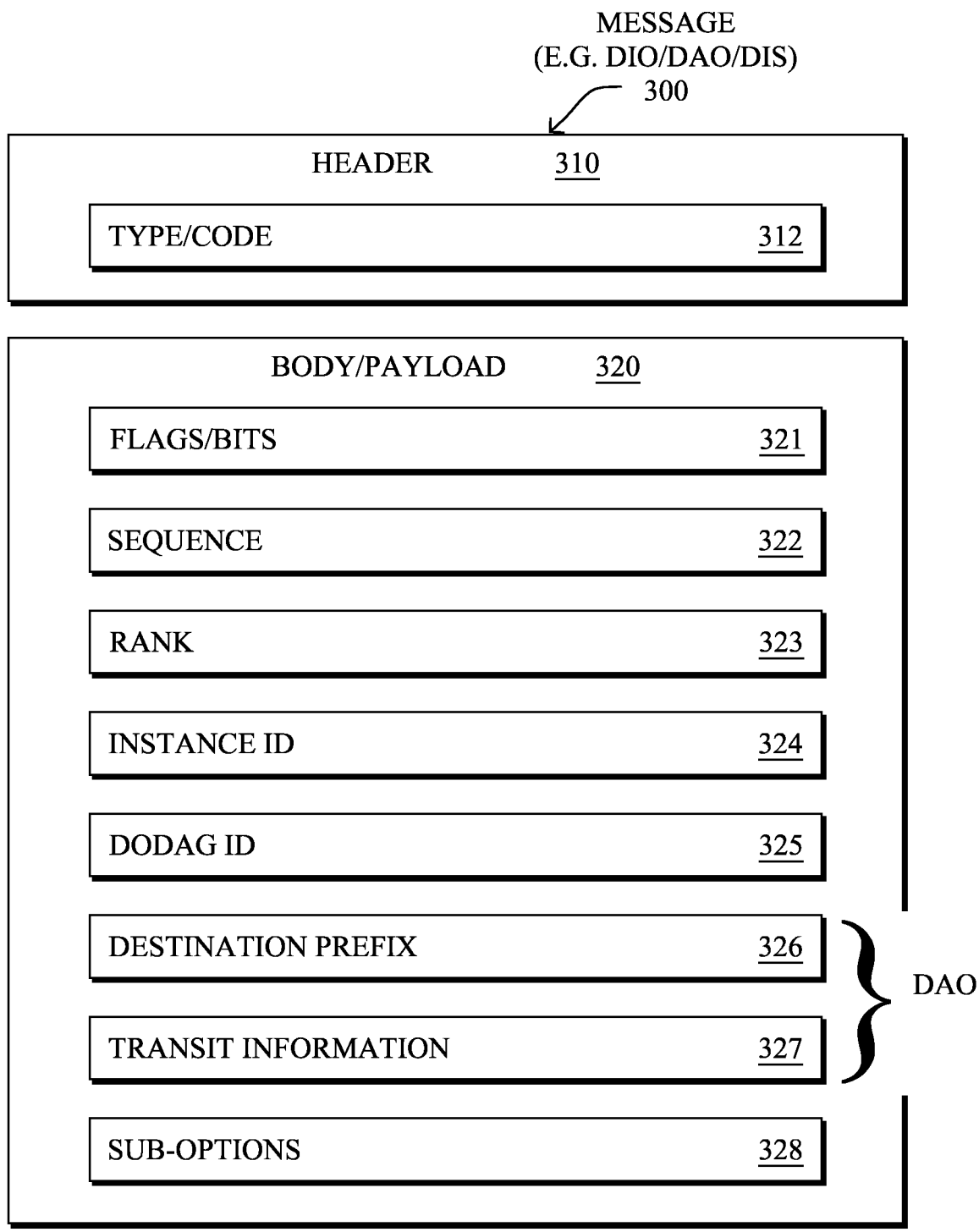
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
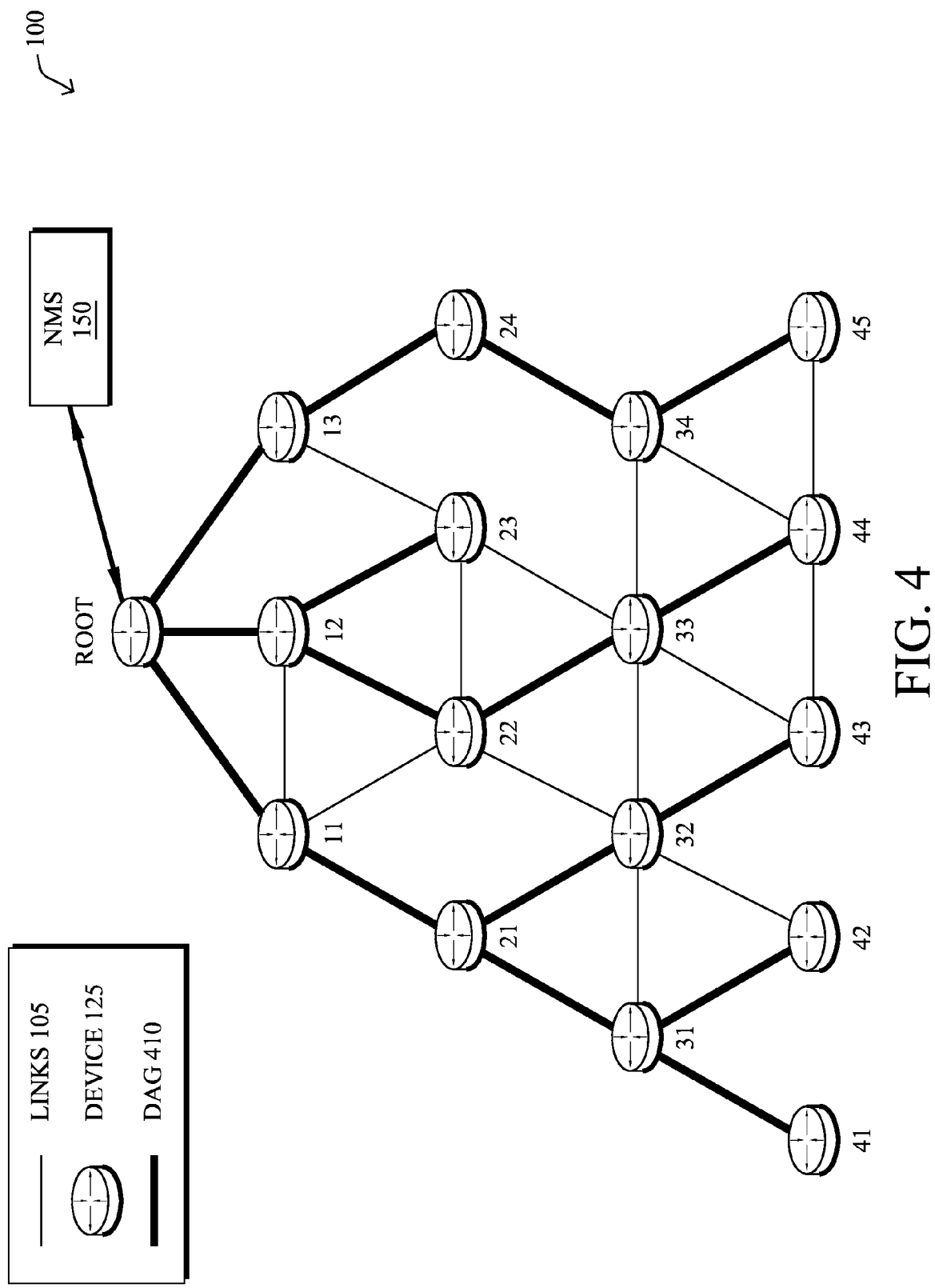
FIG. 4 illustrates an example directed acyclic graph (DAG) in the communication network as in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, one significant challenge with routing in LLNs is ensuring that links to neighboring nodes are valid. More traditional IP networks typically use a proactive keepalive mechanism with a relatively short period, such as the Bidirectional Forwarding Detection (BFD) protocol. Due to the strict resource constraints of LLNs, protocols such as RPL do not rely on proactive keepalive mechanisms. Instead, many LLN protocols typically take a reactive approach, using link-layer acknowledgments and/or IPv6 Neighbor Unreachability Detection (NUD) to update link statistics when forwarding traffic.

Consider, for example, the illustrative cases of a packet 140 sent in the UPWARD direction (i.e., from a network device in the DAG 410 toward/to the root) and in the reverse DOWNWARD direction, (i.e., away from the root toward a particular network device). First, in the UPWARD direction, assume that link 33-22 is down. When node 33 attempts to forward a packet in the UPWARD direction across link 33-22, the node 33 will detect that the link is down, and attempts to select an alternate next-hop (e.g., node 23) or else trigger a local routing repair to find another set of next-hops to send the packet. This reactive approach works well in the UPWARD direction. However, as described below, such a reactive approach does not work as well in the DOWNWARD direction.

In particular, for the DOWNWARD direction, consider a packet 140 sent from the root to node 33. When using source routing, the root will determine a source route from the root to node 33 (e.g., root-12-22-33), append the source route (e.g., using an IPv6 Routing Header), and forwards the packet to node 12. However, when the packet reaches the failing link (e.g., link 22-33), the packet will be dropped.

The fundamental problem is that nodes only maintain links in the UPWARD direction and detect link failures reactively when sending a data packet (generally to avoid proactive keepalive messages). If node 33 has no data packets to send, it will not detect the link failure and will not notify the root that link 22-33 is no longer valid. As a result, the root will continue to send traffic down an invalid path.

Unlike forwarding packets in the UPWARD direction, it is much more difficult to build and repair a routing topology when detecting link failures in the downward direction. In particular, many LLN protocols (e.g., RPL) build routing topologies in the UPWARD direction and reverse the links for use in the DOWNWARD direction. With such protocols, it is the responsibility of devices to maintain their links towards the root. In particular, if node 22 detects that link 22-33 is down, it cannot simply send a message to node 33 to find a new path.

Note that in certain systems, such as unconstrained IP networks, nodes can send regular proactive keepalive messages, then the routing topology will be kept up-to-date on the timescales of the keepalive period. While a short keepalive period will detect link failures more quickly, doing so is costly in resource-constrained environments such as LLNs (e.g., limited energy and channel capacity). In addition, the root could also maintain multiple (diverse) paths and send multiple copies of the packet along each path to increase the likelihood of at least one being received by the destination. However, applying this technique to all traffic is also costly in resource-constrained environments.

Adaptive Reoptimization Trigger Rate

The techniques herein adaptively adjust the rate at which proactive route repairs based on the stability of the network. For example, devices may report statistics that indicate the network's stability (e.g., link/route metrics, retransmissions at link/transport/application layer, ICMP destination unreachable errors, etc.). A centralized "feedback" controller, such as on the DAG root or NMS, uses the network's stability as an input to determine how and with what frequency to perform proactive route (e.g., topology) optimizations. In particular, the frequency of proactively triggering route optimizations is increased when the network is seen as unstable, and the particular trigger used is dependent on the routing protocol in use by the communication network, for example, triggering a new DAG iteration, sending a message to trigger reactive routing mechanisms, etc., and also on the locality of any instability (e.g., sub-DAGs, etc.). (Note that this fundamentally differs from reactive methods that perform route repair in response to forwarding failures or changes in routing information.)

Specifically, according to one or more embodiments of the disclosure as described in detail below, the network stability of a communication network is determined based on one or more network metrics related to stability, and then based on the network stability, a particular frequency at which to perform route reoptimization is determined, where the frequency inversely corresponds to the network stability. As such, distributed route reoptimization is triggered in the communication network at the adaptively determined frequency.

Illustratively, the techniques described herein may be performed by hardware, software, and/or firmware, such as in accordance with the topology reoptimization process 248, which may contain computer executable instructions executed by the processor 220 to perform functions relating to the novel techniques described herein, e.g., in conjunction with routing process 244 (and/or DAG process 246). For example, the techniques herein may be treated as extensions to conventional protocols, such as the RPL protocol or else various communication protocols, and as such, may be processed by similar components understood in the art that execute those protocols, accordingly.

Operationally, a first aspect of the techniques herein is to configure devices 125 in the network to report relevant information that allows a central controller to determine the stability of a network. The central controller may be the NMS 150, DAG Root, or similar device. Information relevant to determining stability may include, for example, 1) link-layer noise-floor measurements, 2) Link and route metrics, for example, ETX, received signal strength indicator (RSSI), and link quality indicator (LQI), etc., 3) route change frequency (e.g., how often devices change DAG parents in a RPL network), 4) unreachability errors, for example, Internet control message protocol (ICMP) "Destination Unreachable" errors messages, which may be generated by individual nodes or intercepted by the DAG root, 5) packet retransmissions, e.g., since many end-to-end reliability mechanisms are implemented at the application layer in LLNs, applications may be instrumented to also provide information such as the number of end-to-end packet retransmissions. Other network metrics related to stability may be generated and/or received from nodes of the communication network, and the above examples are merely representative examples.

Figure 5:
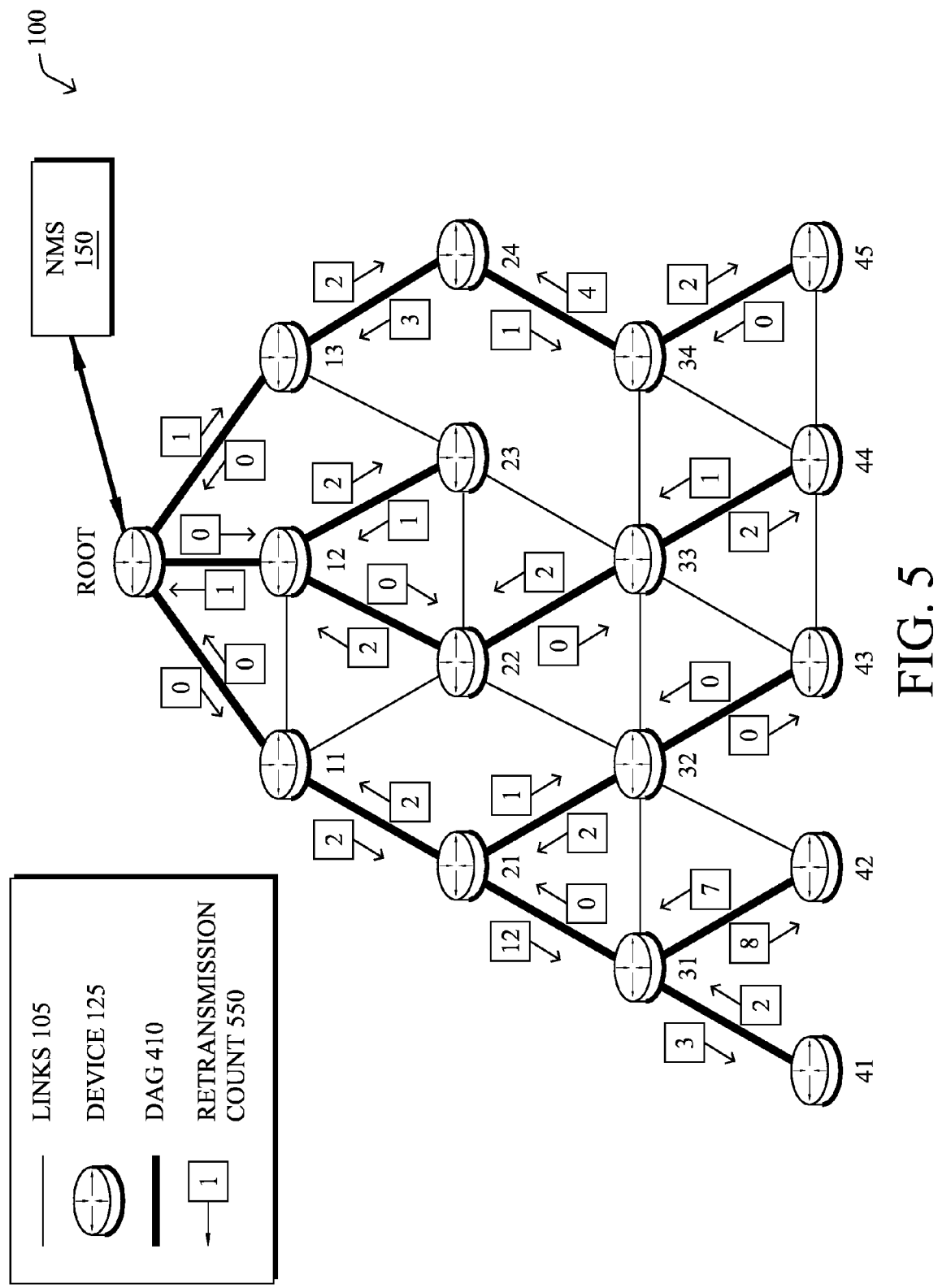
FIG. 5 illustrates an example stability metric in the communication network.

As an illustration, FIG. 5 shows an example stability metric measurement in the communication network 100 of FIG. 1. In particular, assume that the devices 125 are configured to monitor and report packet retransmissions 550, as shown corresponding to each link in the UPWARD and DOWNWARD direction. Note that certain embodiments only monitor and report one direction, while others, such as that shown, provides both metrics. In such an instance, greater intelligence may be afforded, such as monitoring a difference between the metrics in the different directions for discrepancies.

Generally, the collection of the statistics mentioned above can provide reasonable indication on the stability of the network and whether failures are local or more global. That is, the notion of stability may be global to the entire network and/or local to portions of the network, allowing the controller to take different actions depending on the spatial characteristics of the observed network stability. As shown in FIG. 5, for example, it can be seen that there may be an instability localized to a particular portion of the network with generally higher numbers of retransmissions that other portions.

Figure 6:
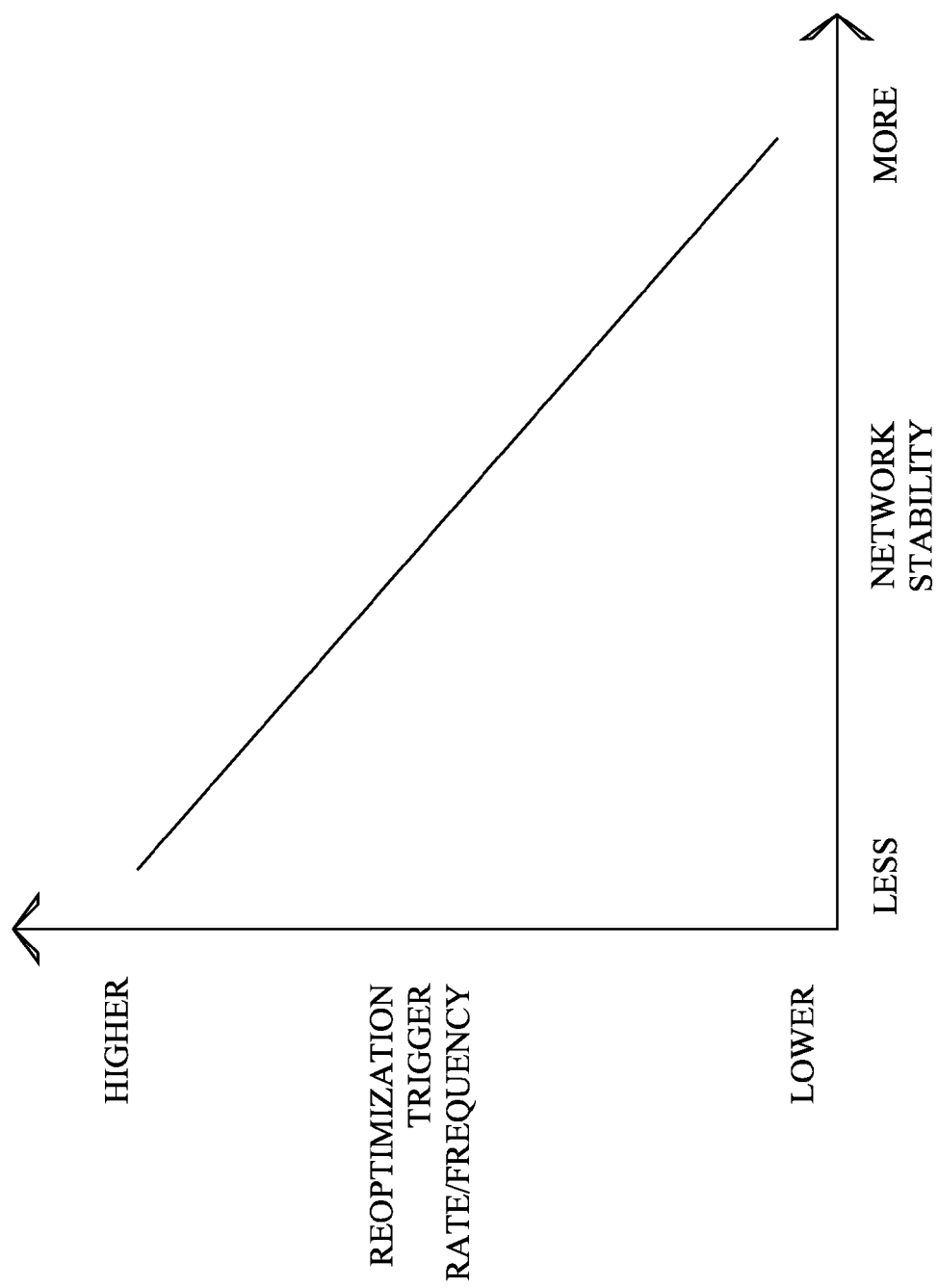
FIG. 6 illustrates an example relationship between network stability and reoptimization frequency/rate.

According to the techniques herein, the observed network stability is used to determine how and with what frequency to proactively perform route optimizations (also called global reoptimization, and may generally refer also to topology optimization). Generally, as shown in FIG. 6, an illustrative example relationship between network stability and reoptimization frequency/rate is where the frequency inversely corresponds to the network stability. Note that while the relationship is shown as proportional, other arrangements include stepped relationships, non-proportional relationships, etc., where greater instability generally results in higher frequencies (rates) of route optimization.

The central controller (e.g., DAG root) first determines if the network stability is acceptable. If not acceptable, the central controller may then determine if the network instability is local or global, i.e., whether the network stability reflects global instability or local instability within the communication network. In response to global instability, the controller may increase the frequency of global repairs, thus triggering global reoptimization at the determined frequency. Conversely, in response to local instability, the local reoptimization may be triggered at the determined frequency. Note that the particular reoptimization actions directed by the controller generally depend on the particular routing protocol.

Figure 7A:
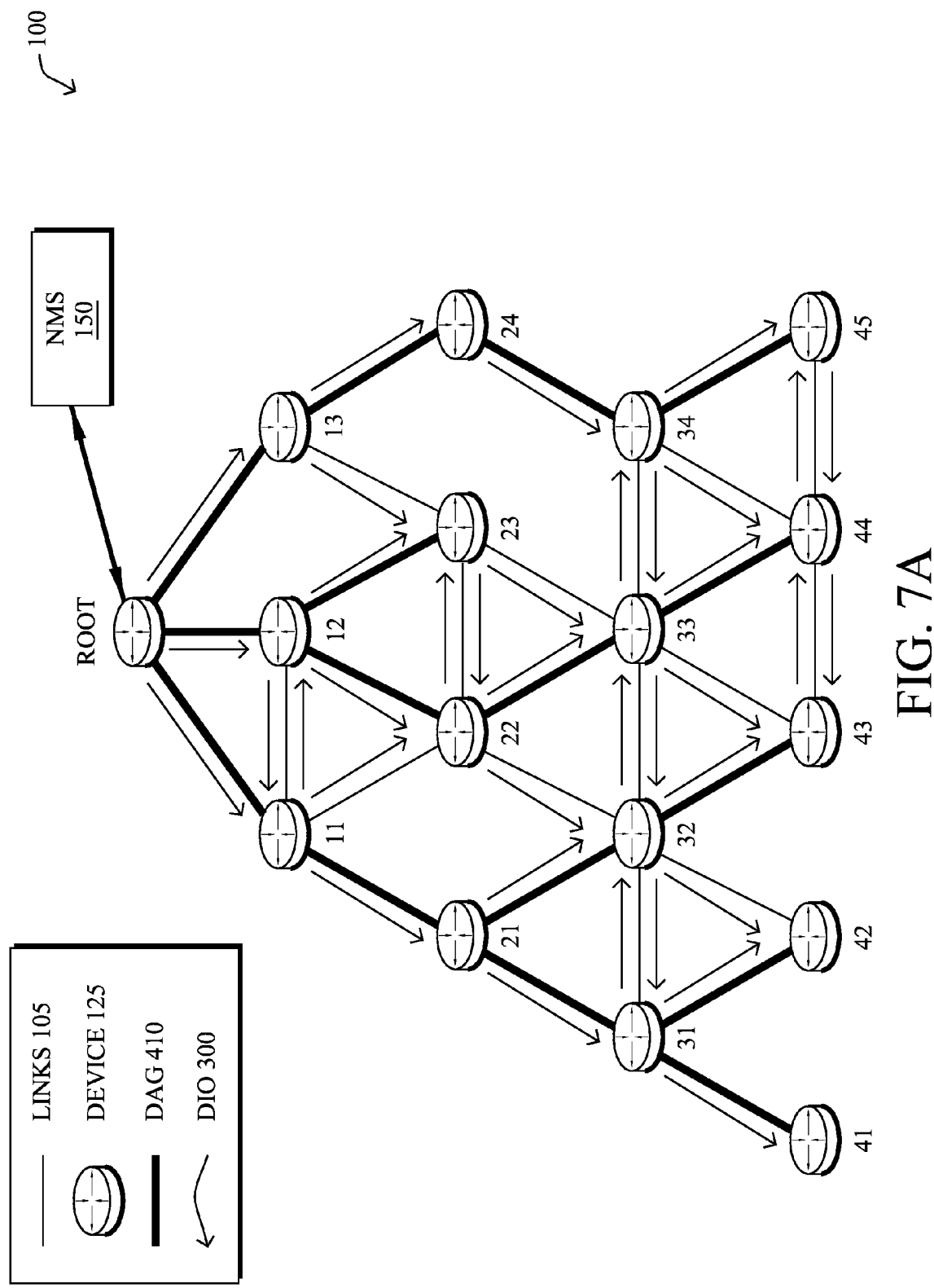
FIGS. 7A-7B illustrate an example topology reoptimization.
Figure 7B:
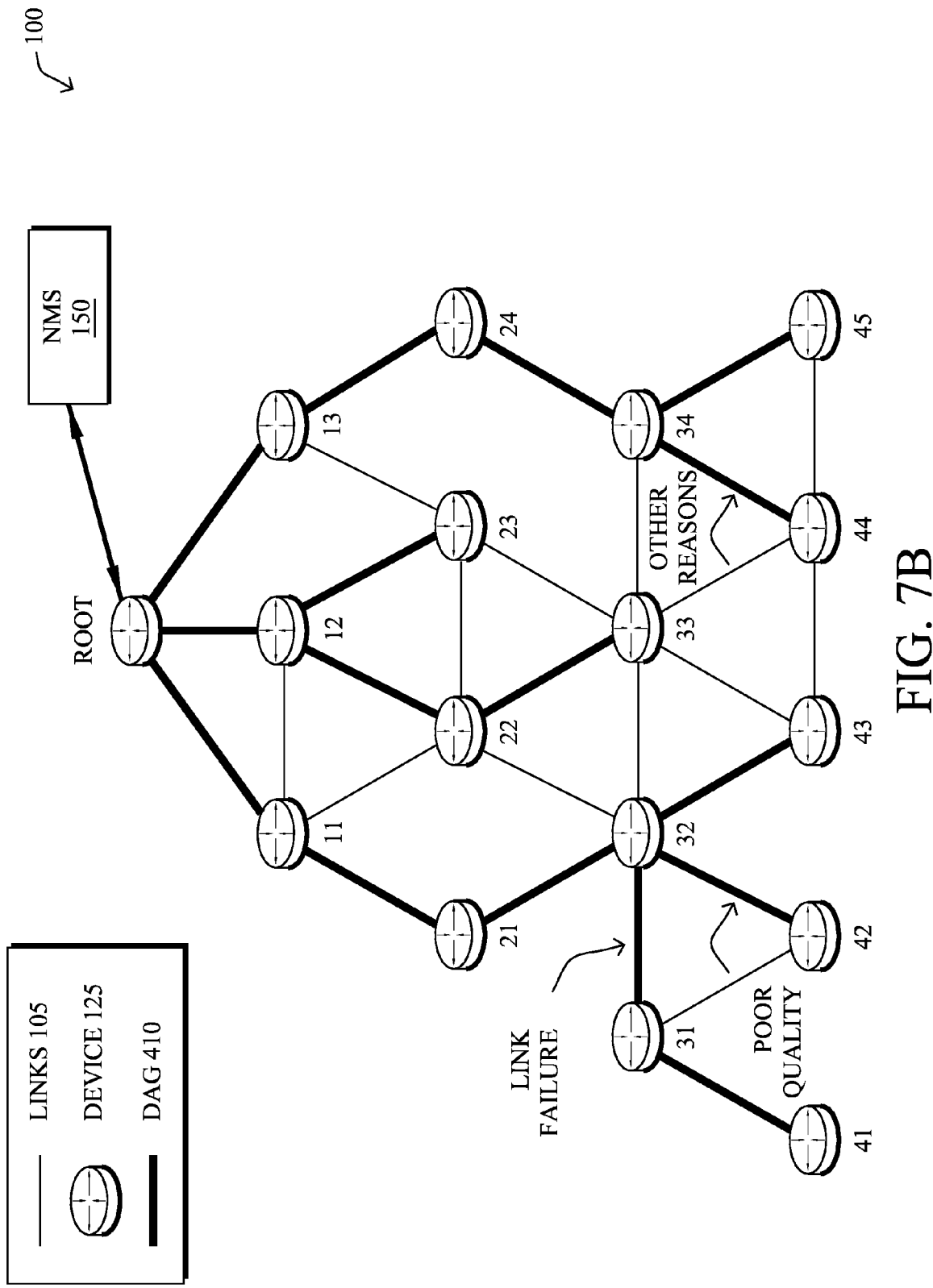

For example, in the case of RPL, or other similar proactive routing protocols, a global repair consists of incrementing a topology instance identifier (ID), such as the RPLInstanceID, which resets the trickle timers and correspondingly triggers a rebuild of the routing topology. Note that in shared-media communication networks, such as wireless and PLC networks, global repairs may be the norm. FIG. 7A illustrates an example topology reoptimization where a new instance ID is distributed to the devices 125 of the network 100 (a new DIO message 300), after which, an updated DAG 410 may result based on more current reachability, as shown in FIG. 7B. Note that certain links may be missing/failed, others may simply have poor quality, while still others may have other metrics that result in a new change (e.g., a global change may affect more than just those links triggering the increased rate).

Note further that since the DAG has changed, there may have been a number of route changes from the previous DAG. The number of route changes may thus be used to indicate potential instability, where greater numbers of changes indicate that many links previously thought to be the most "optimal" (e.g., based on the Objective Function) have changed. Alternatively, if the number of route changes for the new DAG is minimal, then the network may be deemed relatively stable. Accordingly, the rate of reoptimization may be increased or decreased to account for the level of stability, respectively.

Figure 8A:
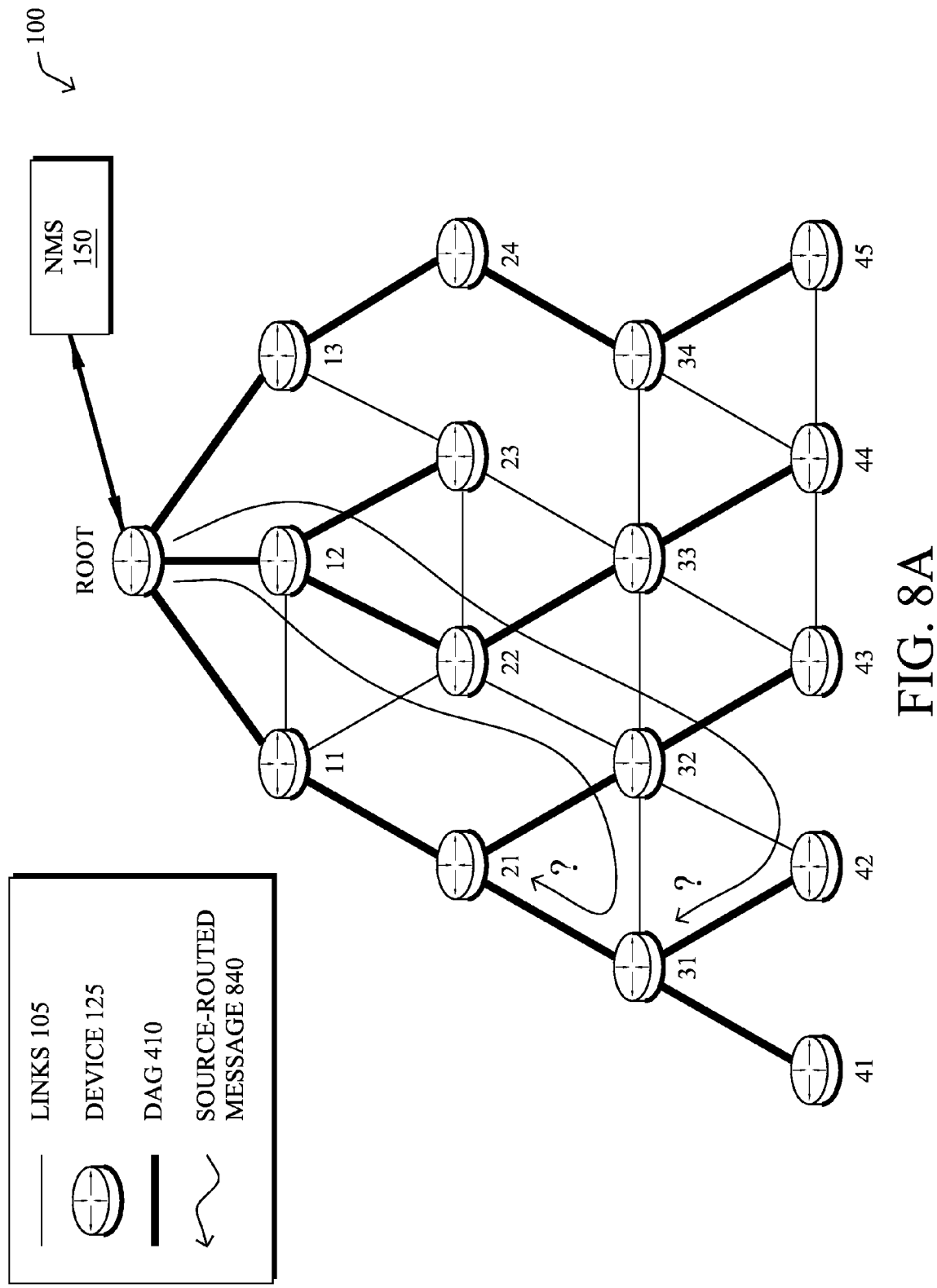
FIGS. 8A-8C illustrate an additional example topology reoptimization.
Figure 8B:
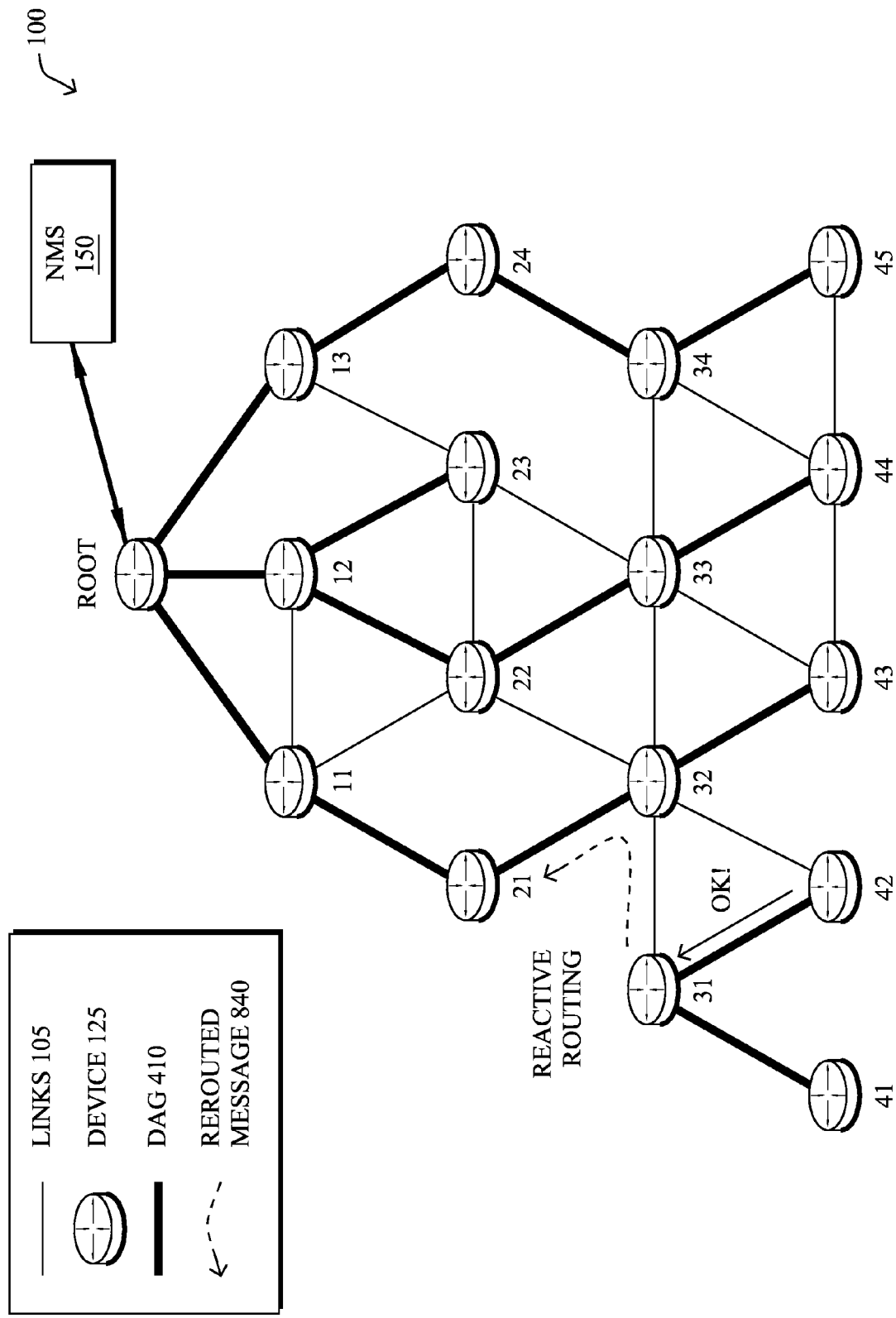
Figure 8C:
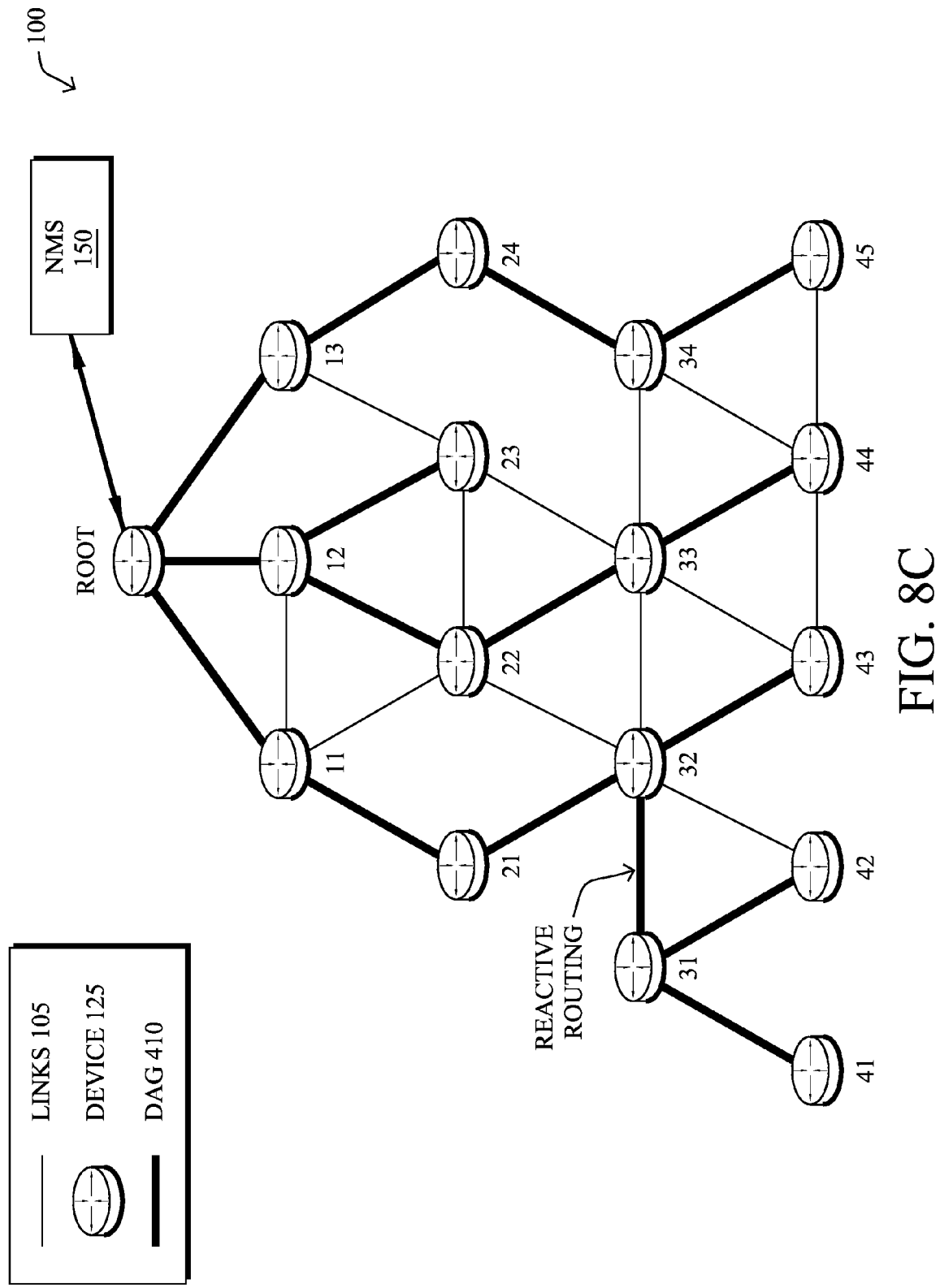

In another embodiment, such as where the network uses a reactive routing protocol, the controller may proactively send a message (e.g., UDP or ICMP) to one or more targeted destinations in the communication network to correspondingly trigger reactive topology rebuilding in the communication network. In particular, proactively sending messages causes the reactive routing protocol to discover, evaluate, and/or update routes. Because reactive routing protocols do not update their routing information when no traffic exists, proactively sending traffic ensures that such routing information remains fresh. FIG. 8A, for instance, illustrates source routed traffic 840 sent via a particular selected path through the network in order to reach the affected location, such as a particular device/link, or else a collection of devices in a troubled area. In this manner, a new path may be reactively determined, as shown in FIG. 8B, and a new DAG topology rebuilt as shown in FIG. 8C. Accordingly, with the newly built DAG, the DOWNWARD paths may be more up-to-date, and presumably reachable when used.

Figure 9A:
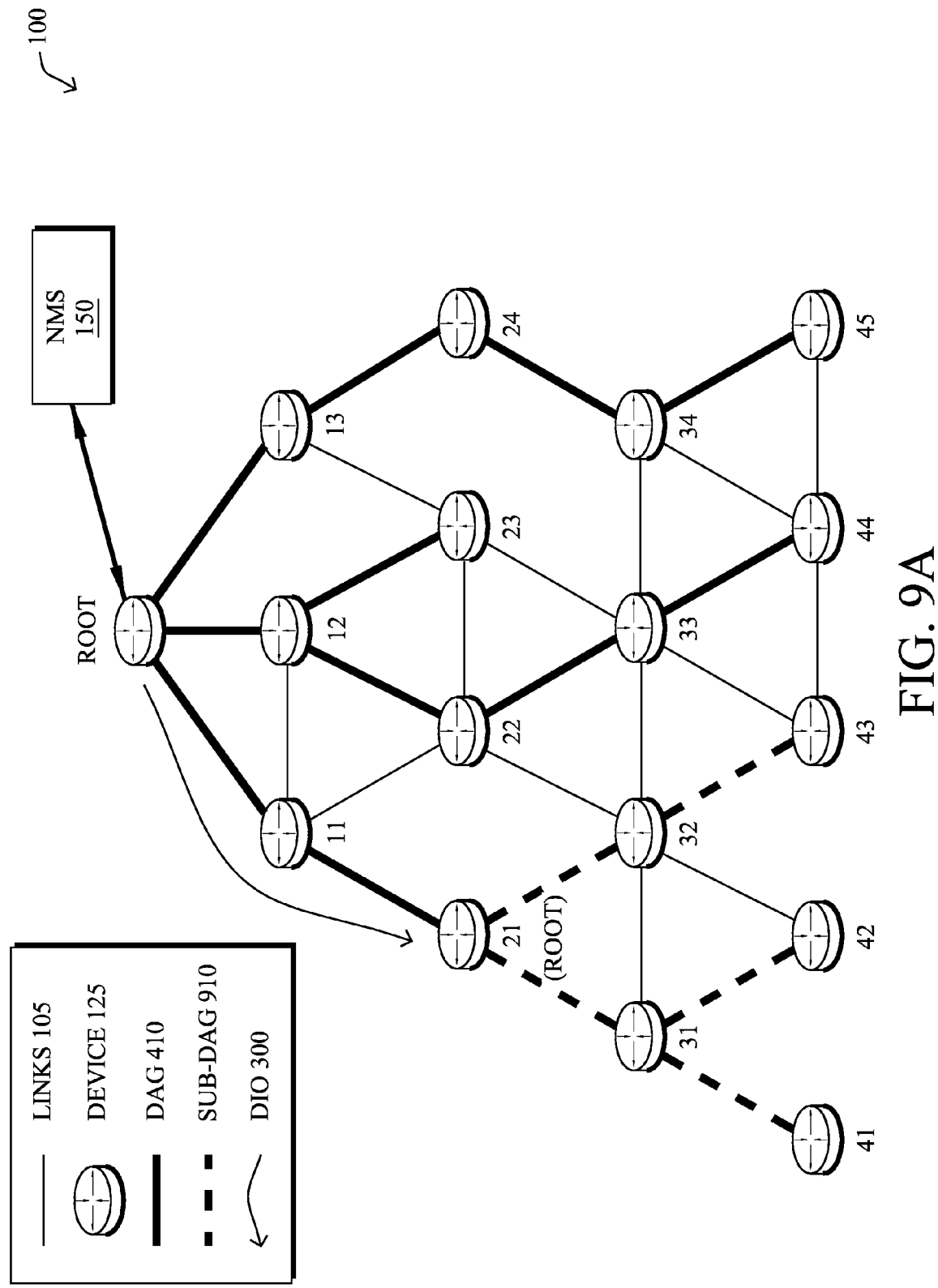
FIGS. 9A-9B illustrate an additional example topology reoptimization.
Figure 9B:
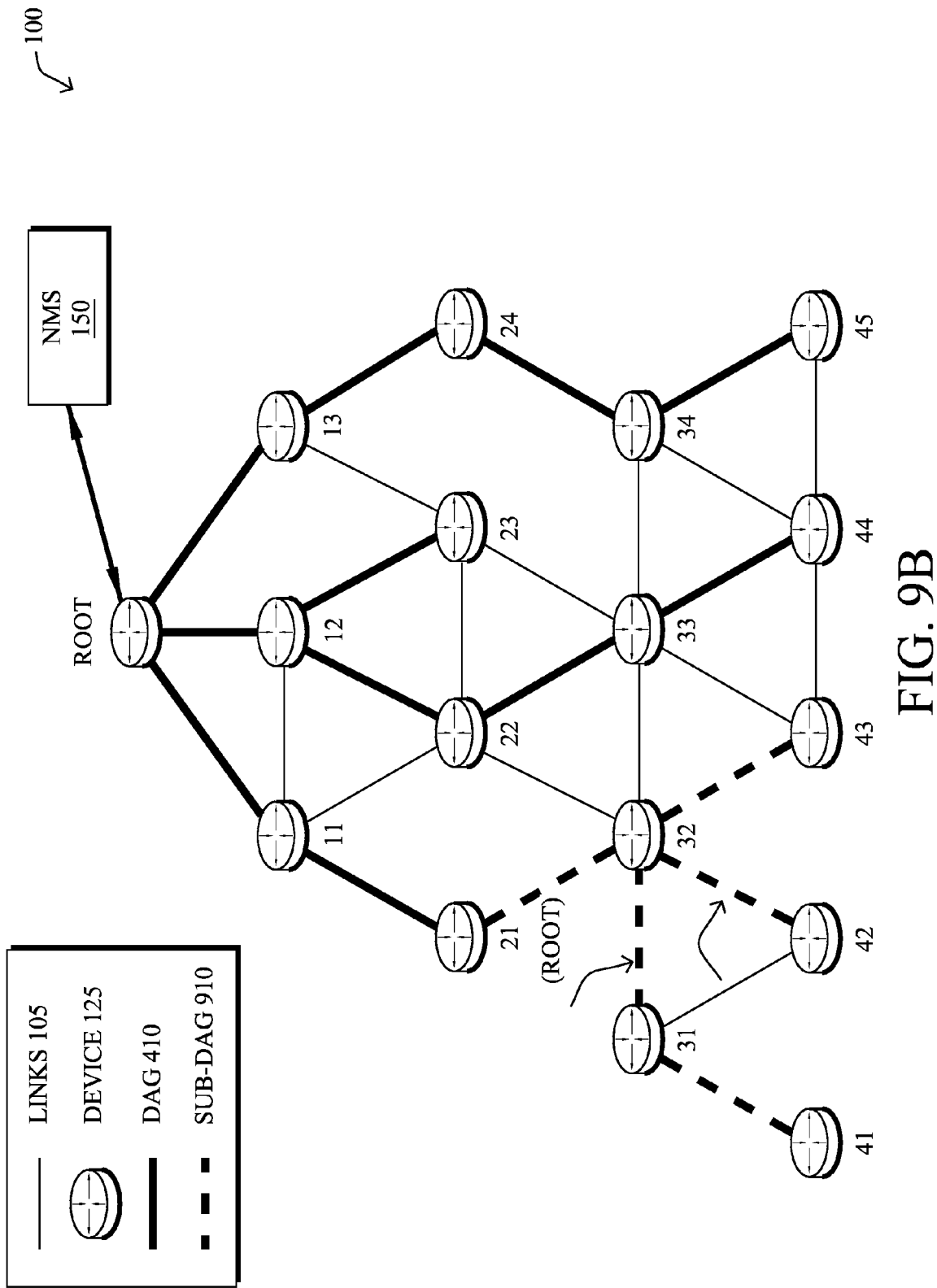

In still another illustrative embodiment, the controller may operate on subsets of the networking topology or specific localities. For example, if the network is split into different routing domains, the controller may take different actions for each routing domain. In the case of RPL, for instance, a network may be split into a number of sub-DAGs, all connected by a higher-layer "encompassing" DAG. The network stability may thus be specific to a particular sub-DAG, and the distributed route reoptimization may correspondingly occur in a respective sub-DAG. Said differently, the controller may thus choose to perform proactive repairs for one or more individual sub-DAGs and the higher-layer global DAG. FIG. 9A, for example, illustrates the decision to control a single sub-DAG 910 (shown as bold dashed lines), which has device 21 as its root node. By directing a single DIO message 300 for the specific sub-DAG, as shown in FIG. 9B the sub-DAG may be instructed (e.g., with a new topology instance ID) to rebuild itself, and to update the current topology.

According to the techniques herein, therefore, when the network is deemed less stable, reoptimizations may be triggered more often, thus keeping the network more updated and increasing the likelihood that routes are reachable as expected. In particular, where DOWNWARD links are based entirely on actively maintained UPWARD links, the rate at which the UPWARD links are confirmed or corrected directly affects the reliability of the corresponding DOWNWARD links.

Note that while the "central controller" may be solely hosted on the NMS or DAG root, the functionality to determine the frequency to initiate reoptimization triggers described herein may be specifically hosted on the DAG root with the NMS providing stability information collected from the nodes. That is, in one embodiment, determining the network stability, determining with what frequency to perform route reoptimization, and triggering distributed route reoptimization may be performed by a single device. In an alternative embodiment, determining the network stability is performed by a first device (e.g., the NMS), and determining with what frequency to perform route reoptimization and triggering distributed route reoptimization are performed by a second device (e.g., the root device). In this particular embodiment, the DAG root may thus correspondingly "determine the network stability" by receiving the network stability as derived from an NMS.

Figure 10:
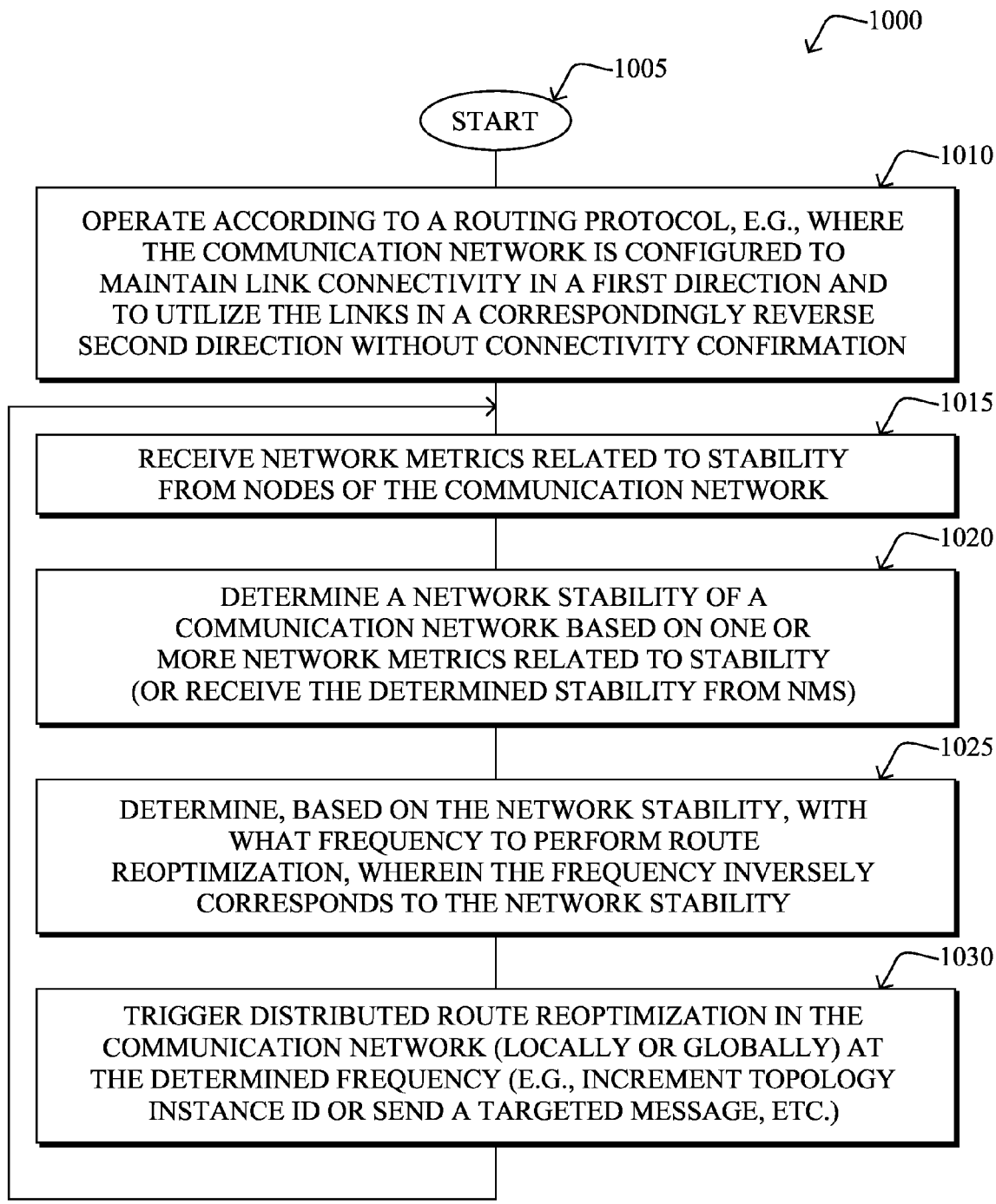
FIG. 10 illustrates an example simplified procedure for adaptive rate control of topology reoptimizations in a communication network.

FIG. 10 illustrates an example simplified procedure for adaptive rate control of topology reoptimizations in a communication network in accordance with one or more embodiments described herein. The procedure 1000 starts at step 1005, and continues to step 1010, where, as described in greater detail above, the nodes of the network 100 operate according to a routing protocol. In one illustrative embodiment, for instance, the communication network is configured to maintain link connectivity in a first direction and to utilize the links in a correspondingly reverse second direction without connectivity confirmation. In step 1015, the centralized controller (e.g., NMS or root node) receives network metrics related to stability from nodes of the communication network, as described above. In step 1020, the centralized controller determines a network stability of the communication network based on one or more network metrics related to stability. Note that in an alternative embodiment as also noted above, one centralized node (e.g., the root node) may receive the determined network stability from another centralized node (e.g., the NMS).

Based on the network stability, in step 1025 the centralized controller determines a particular frequency to perform route reoptimization, where the frequency inversely corresponds to the network stability (as shown in FIG. 6 above). Accordingly, in step 1030, the centralized controls triggers the distributed route reoptimization in the communication network (locally or globally) at the determined frequency (e.g., incrementing a topology instance ID, sending a targeted message, etc.). The adaptive procedure 1000 returns to step 1015 to continue to update the trigger's frequency based on the network stability.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 1000 is described in a single flowchart, certain steps from the procedure may be performed by different devices, e.g., as described above, accordingly.

The novel techniques described herein, therefore, provide for adaptive rate control of topology reoptimizations in a communication network. In particular, the techniques herein address a significant challenge with DOWNWARD routes by dynamically adjusting the frequency and scope of route repairs (reoptimization), and thus minimize control overhead caused by broken (unreachable/unconnected) routes. In addition, the techniques herein do not rely on any form of centralized path computation, but instead collect stability metrics, e.g., statistics on broken DOWNWARD paths, to helps identify a set of actions to proactively repair paths using a variety of distributed routing techniques.

While there have been shown and described illustrative embodiments that provide for adaptive rate control of topology reoptimizations in a communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols (e.g., wireless). In particular, while certain protocols are shown, such as RPL, other suitable protocols may be used, accordingly. Also, while a communication network that maintains link connectivity in one direction and utilizes the links in a correspondingly reverse direction without connectivity confirmation is shown, other types of routing protocols may be used. Further, while certain types of reoptimization and/or repair techniques are shown and described, other topology adjustment actions may be taken according to the adaptive frequency triggering.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such varia-

What is claimed is:

1. A method, comprising:
   determining, by a network device, a network stability of a communication network based on one or more network metrics related to stability;
   determining, by the network device, based on the network stability, with what frequency to perform route reoptimization, wherein the frequency inversely corresponds to the network stability; and
   triggering, by the network device, distributed route reoptimization in the communication network at the determined frequency.

2. The method as in claim 1, wherein the communication network is configured to maintain link connectivity in a first direction and to utilize the links in a correspondingly reverse second direction without connectivity confirmation.

3. The method as in claim 1, wherein the network metrics related to stability are selected from a group consisting of: route change frequency; unreachability errors; packet retransmissions; expected retransmission count (ETX); link metrics; route metrics; and link-layer noise-floor measurements.

4. The method as in claim 3, further comprising:
   receiving the one or more network metrics related to stability from nodes of the communication network.

5. The method as in claim 1, further comprising:
   determining whether the network stability reflects global instability or local instability within the communication network; and
   in response to global instability, triggering global reoptimization at the determined frequency; and
   in response to local instability, triggering local reoptimization at the determined frequency.

6. The method as in claim 1, wherein determining the network stability, determining with what frequency to perform route reoptimization, and triggering distributed route reoptimization are performed by a single device.

7. The method as in claim 1, wherein determining the network stability is performed by a first device, and wherein determining with what frequency to perform route reoptimization and triggering distributed route reoptimization are performed by a second device.

8. The method as in claim 1, wherein the communication network operates according to a proactive routing protocol, and wherein triggering comprises:
   incrementing a topology instance identifier (ID) to correspondingly trigger a topology rebuild in the communication network.

9. The method as in claim 1, wherein the communication network operates according to a reactive routing protocol, and wherein triggering comprises:
   sending a message to one or more targeted destinations in the communication network to correspondingly trigger reactive topology rebuilding in the communication network.

10. The method as in claim 1, wherein the communication network is a sub-directed acyclic graph (sub-DAG) of an encompassing DAG, and wherein the network stability is specific to the sub-DAG, and wherein the distributed route reoptimization occurs in the sub-DAG.

11. An apparatus, comprising:
    one or more network interfaces to communicate with a communication network;
    a processor coupled to the network interfaces and adapted to execute one or more processes; and
    a memory configured to store a process executable by the processor, the process when executed operable to:
       determine a network stability of the communication network based on one or more network metrics related to stability;
       determine, based on the network stability, with what frequency to perform route reoptimization, wherein the frequency inversely corresponds to the network stability; and
       trigger distributed route reoptimization in the communication network at the determined frequency.

12. The apparatus as in claim 11, wherein the communication network is configured to maintain link connectivity in a first direction and to utilize the links in a correspondingly reverse second direction without connectivity confirmation.

13. The apparatus as in claim 11, wherein the network metrics related to stability are selected from a group consisting of: route change frequency; unreachability errors; packet retransmissions; expected retransmission count (ETX); link metrics; route metrics; and link-layer noise-floor measurements.

14. The apparatus as in claim 13, wherein the process when executed is further operable to:
    receive the one or more network metrics related to stability from nodes of the communication network.

15. The apparatus as in claim 11, wherein the process when executed is further operable to:
    determine whether the network stability reflects global instability or local instability within the communication network; and
    in response to global instability, trigger global reoptimization at the determined frequency; and
    in response to local instability, trigger local reoptimization at the determined frequency.

16. The apparatus as in claim 11, wherein the apparatus is selected from a group consisting of: a root node of a directed acyclic graph (DAG); and a network management server (NMS).

17. The apparatus as in claim 11, wherein the apparatus is a root node of a directed acyclic graph (DAG), and wherein the process when executed to determine the network stability is further operable to:
    receive the network stability from a network management server (NMS).

18. The apparatus as in claim 11, wherein the communication network operates according to a proactive routing protocol, and wherein the process when executed to trigger is further operable to:
    increment a topology instance identifier (ID) to correspondingly trigger a topology rebuild in the communication network.

19. The apparatus as in claim 11, wherein the communication network operates according to a reactive routing protocol, and wherein the process when executed to trigger is further operable to:
    send a message to one or more targeted destinations in the communication network to correspondingly trigger reactive topology rebuilding in the communication network.

20. The apparatus as in claim 11, wherein the communication network is a sub-directed acyclic graph (sub-DAG) of an encompassing DAG, and wherein the network stability is specific to the sub-DAG, and wherein the distributed route reoptimization occurs in the sub-DAG.

21. A tangible, non-transitory, computer-readable media having software encoded thereon, the software when executed by a processor operable to:

determine a network stability of a communication network based on one or more network metrics related to stability;

determine, based on the network stability, with what frequency to perform route reoptimization, wherein the frequency inversely corresponds to the network stability; and trigger distributed route reoptimization in the communication network at the determined frequency.

22. The computer-readable media as in claim 21, wherein the communication network is configured to maintain link connectivity in a first direction and to utilize the links in a correspondingly reverse second direction without connectivity confirmation.

23. The computer-readable media as in claim 21, wherein the network metrics related to stability are selected from a group consisting of: route change frequency; unreachability errors; packet retransmissions; expected retransmission count (ETX); link metrics; route metrics; and link-layer noise-floor measurements.

24. The computer-readable media as in claim 21, wherein the software when executed is further operable to:

determine whether the network stability reflects global instability or local instability within the communication network; and in response to global instability, trigger global reoptimization at the determined frequency; and in response to local instability, trigger local reoptimization at the determined frequency.

25. The computer-readable media as in claim 21, wherein the software is executed on a root node of a directed acyclic graph (DAG), and wherein the software when executed to determine the network stability is further operable to:

receive the network stability from a network management server (NMS).

* * * * *